United States Patent
Wang et al.

(10) Patent No.: US 8,948,275 B2
(45) Date of Patent: Feb. 3, 2015

(54) POWER LINE COMMUNICATION SYSTEM FOR VEHICLE

(71) Applicant: DENSO CORPORATION, Kariya, Aichi-pref. (JP)

(72) Inventors: Fan Wang, Nagoya (CN); Yuukou Murase, Nagoya (JP); Yoshie Sugiura, Nagoya (JP); Akira Takaoka, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/013,209

(22) Filed: Aug. 29, 2013

(65) Prior Publication Data
US 2014/0064388 A1    Mar. 6, 2014

(30) Foreign Application Priority Data
Sep. 3, 2012   (JP) .................................. 2012-193092

(51) Int. Cl.
*H04B 3/00*    (2006.01)
*H04B 3/54*    (2006.01)

(52) U.S. Cl.
CPC ...................................... *H04B 3/548* (2013.01)
USPC ........................................................ 375/257

(58) Field of Classification Search
CPC ........ G05B 11/01; G08C 19/12; G08C 19/16; G06F 7/00; H04B 1/00; H04B 3/28; H04B 3/46; H04B 3/54; H04B 3/548; H04B 3/56; H04B 3/57; H04B 3/58; H04B 5/00; H02J 7/00; H02J 17/00; H04J 11/00; H04M 11/04; H04L 12/40; H04L 27/00

USPC .................. 320/109, 137; 333/12; 340/12.32, 340/13.23, 310.01, 310.02, 310.07, 310.11, 340/310.15, 415.1, 425.5, 538; 370/208, 370/210, 344, 437, 480; 375/219, 222, 224, 375/257–260, 295; 701/1, 2, 49

See application file for complete search history.

(56) References Cited

U.S. PATENT DOCUMENTS 6,321,067 B1 *  11/2001  Suga et al. .................... 455/41.2
7,852,206 B2 *  12/2010  Yanagida et al. ............. 340/538

(Continued)

FOREIGN PATENT DOCUMENTS

JP    03-289302 A    12/1991
JP    2005-045327 A    2/2005

(Continued)

*Primary Examiner* — Jaison Joseph
*Assistant Examiner* — Shawkat M Ali
(74) *Attorney, Agent, or Firm* — Posz Law Group, PLC

(57) ABSTRACT

In a power line communication system, a master uses a twisted pair wire as a power line and a communication line and outputs a power signal and a data modulation signal to a slave. The slave includes an aperture antenna, a power monitoring portion, and a determining portion. The aperture antenna receives the power signal via the twisted pair wire by electromagnetic induction coupling of an electromagnetic field generated at the twisted pair wire in accordance with an applied current of the twisted pair wire. The aperture antenna has an aperture region facing an aperture region between twists of the twisted pair wire. The power monitoring portion monitors a power of the power signal received via the first aperture antenna. The determination portion determines whether to use another operation power received via the twisted pair wire on the basis of the power monitored by the power monitoring portion.

13 Claims, 12 Drawing Sheets

(56) References Cited

U.S. PATENT DOCUMENTS

| | | |
|---|---|---|
| 2001/0028678 A1 | 10/2001 | Kato et al. |
| 2004/0155720 A1* | 8/2004 | Yasui et al. ............... 333/12 |
| 2006/0224278 A1* | 10/2006 | Yanagida et al. ............ 701/1 |
| 2008/0298226 A1* | 12/2008 | Mizutani .................. 370/208 |
| 2011/0286544 A1* | 11/2011 | Avudainayagam et al. .. 375/295 |
| 2011/0307123 A1* | 12/2011 | Abe et al. .................... 701/2 |
| 2012/0146776 A1* | 6/2012 | Eguchi .................. 340/12.32 |
| 2013/0026988 A1* | 1/2013 | Igata ........................ 320/109 |
| 2013/0169421 A1 | 7/2013 | Murase et al. |
| 2013/0208775 A1 | 8/2013 | Wang et al. |

FOREIGN PATENT DOCUMENTS

| | | |
|---|---|---|
| JP | 2005-303632 A | 10/2005 |
| JP | 2006-352849 A | 12/2006 |
| JP | 2008-017185 A | 1/2008 |
| JP | 2013-026831 A | 2/2013 |

* cited by examiner

FIG. 2A
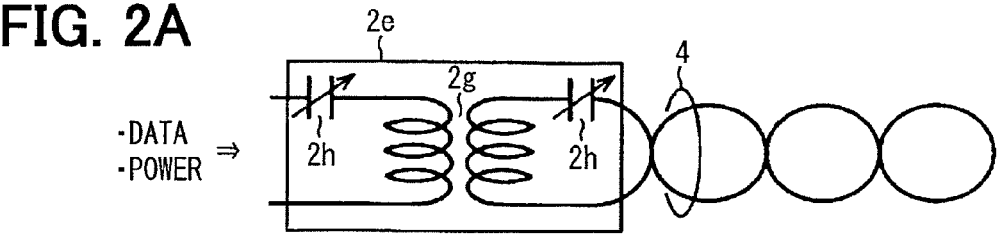
FIG. 2B
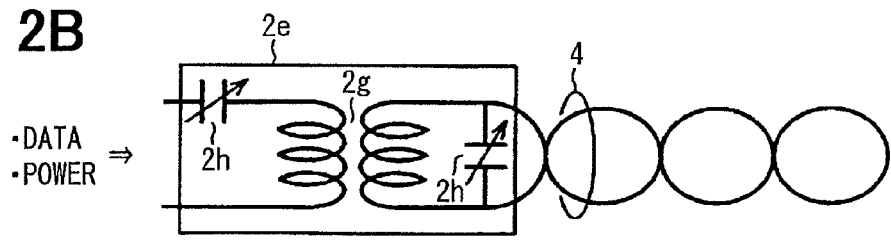
FIG. 2C
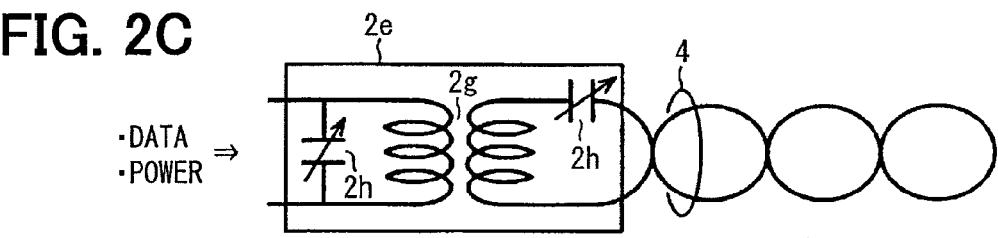
FIG. 2D
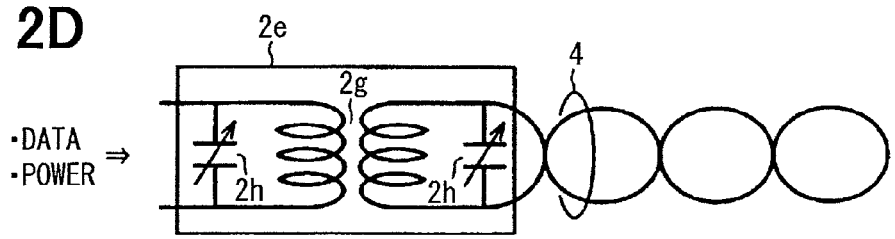
FIG. 2E  FIG. 2F  FIG. 2G  FIG. 2H
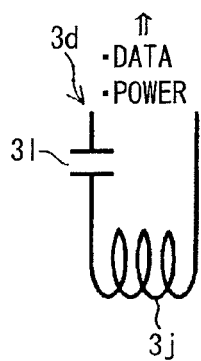 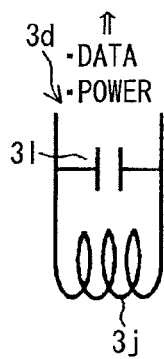 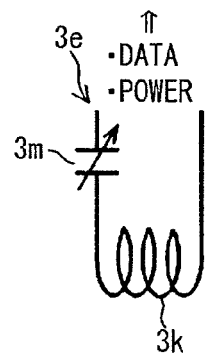 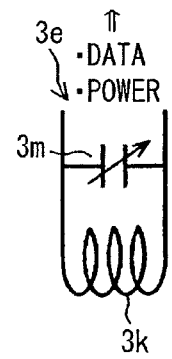

POWER LINE COMMUNICATION SYSTEM FOR VEHICLE

CROSS REFERENCE TO RELATED APPLICATIONS

The present application is based on and claims priority to Japanese Patent Application No. 2012-193092 filed on Sep. 3, 2012, the contents of which are incorporated in their entirety herein by reference.

TECHNICAL FIELD

The present disclosure relates to a power line communication system for a vehicle and a receiving device used in the power line communication system.

BACKGROUND

A plurality of electronic control units (ECU) is provided in a vehicle and communicates with each other to smoothly ensure various controls in the vehicle. For this purpose, a power line communication (PLC) system may be employed. The power line communication system embodies a technology that transmits signals by superimposing the signals on high-frequency carriers for communication. JP-A-2005-45327 discloses an example of the technology. According to the technology, a balanced feed line including two parallel lines is attached to a mobile object near a loop-formed coupler. This enables electromagnetic induction coupling between the mobile object and the balanced feed line.

However, the inventors have made it clear that the electric power or signal communication using electromagnetic induction coupling according to the conventional technology generates much leakage magnetic flux at portions other than a coupling portion where the electric power or signals are exchanged. Even if the above-described technique is employed, for example, when a transmission path characteristic, a surrounding environment of a system and the like change, a communication quality decreases and it is difficult to maintain a high-speed communication.

SUMMARY

An object of the present disclosure is to provide a power line communication system that can strength magnetic induction coupling between a master and a slave and can maintain a communication quantity and a high-speed communication. Another object of the present disclosure is to provide a receiving device that can maintain a communication quantity and a high-speed communication.

According to an aspect of the present disclosure, a power line communication system for a vehicle includes a master and a slave. The master uses a twisted pair wire, in which core wires are connected at an end to form a loop shape, as a power line and a communication line and outputs a high-frequency signal to the twisted pair wire to transmit a power signal and a data modulation signal. The slave receives the power signal and the data modulation signal transmitted from the master. The slave includes an aperture antenna, a power monitoring portion, and a determining portion. The aperture antenna has a loop shape and receives the power signal via the twisted pair wire by electromagnetic induction coupling of an electromagnetic field generated at the twisted pair wire in accordance with an applied current of the twisted pair wire. The aperture antenna has an aperture region facing an aperture region between twists of the twisted pair wire. The slave operates by the power signal received via the aperture antenna. The power monitoring portion monitors a power of the power signal received via the aperture antenna. The determination portion determines whether to use another operation power received via the twisted pair wire on the basis of the power monitored by the power monitoring portion.

In the power line communication system, the determining portion determines whether to use another operation power on the basis of the power monitored by the monitoring portion. Thus, even when the slave has a shortage of operation power, the slave can continue a power line communication using another operation power and can maintain a communication quantity and a high-speed communication.

According to another aspect of the present disclosure, a receiving device for communicating with a master via a twisted pair wire as a power line and a communication line includes a slave. The slave receives a power signal and a data modulation signal transmitted from the master. The slave includes an aperture antenna, a power monitoring portion, and a determining portion. The aperture antenna has a loop shape and receives the power signal via the twisted pair wire by electromagnetic induction coupling of an electromagnetic field generated at the twisted pair wire in accordance with an applied current of the twisted pair wire. The aperture antenna has an aperture region facing an aperture region between twists of the twisted pair wire. The slave operates by the power signal received via the aperture antenna. The power monitoring portion monitors a power of the power signal received via the aperture antenna. The determination portion determines whether to use another operation power received via the twisted pair wire on the basis of the power monitored by the power monitoring portion.

In the receiving device, the determining portion in the slave determines whether to use another operation power on the basis of the power monitored by the monitoring portion. Thus, even when the slave has a shortage of operation power, the slave can continue a power line communication using another operation power and can maintain a communication frequency and a high-speed communication.

BRIEF DESCRIPTION OF THE DRAWINGS

Additional objects and advantages of the present disclosure will be more readily apparent from the following detailed description when taken together with the accompanying drawings. In the drawings:

FIG. 2A through FIG. 2D are diagrams showing examples of a matching circuit in a master, FIG. 2E and FIG. 2F are diagrams showing examples of a feeding matching circuit in a slave, and FIG. 2G and FIG. 2H are diagrams showing examples of a communication matching circuit in the slave;

DETAILED DESCRIPTION

First Embodiment

Figure 1:
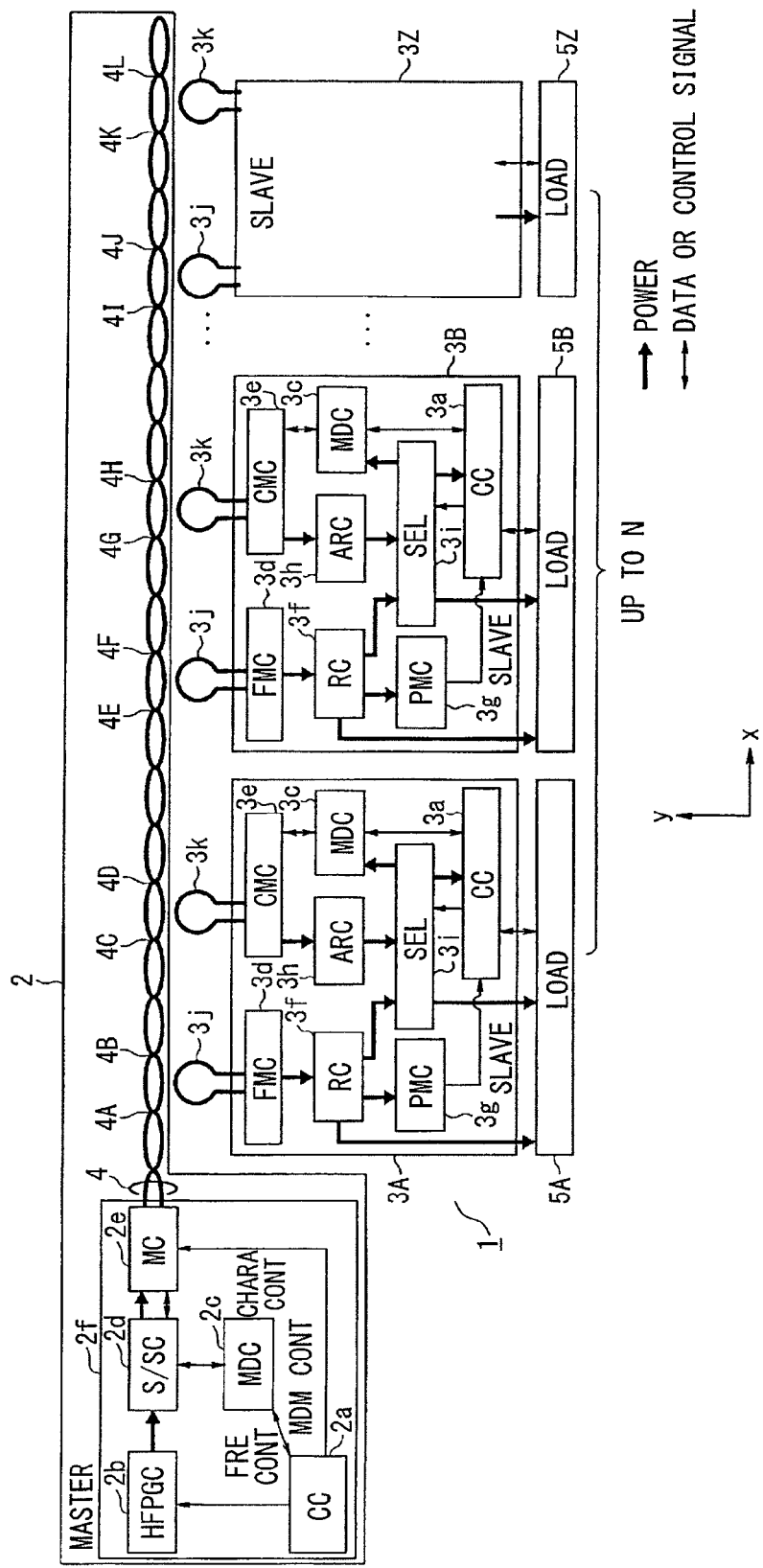
FIG. 1 is a block diagram showing a power line communication system according to a first embodiment of the present disclosure.

A power line communication system 1 for a vehicle according to a first embodiment of the present disclosure will be described with reference to FIG. 1 through FIG. 13. The vehicular power line communication system 1 includes a master 2 and slaves 3A through 3Z. The master 2 is connected with a battery (not shown). The master 2 supplies power of the battery (not shown) to the slaves 3A through 3Z via a power line. The slaves 3A through 3Z operate in accordance with the supplied power. The slaves 3A through 3Z are connected with loads 5A through 5Z including sensors and actuators.

The master 2 includes a master body (communication apparatus body) 2f that includes a control circuit (CC) 2a to control communication and other functions, a high-frequency power generation circuit (HFPGC) 2b, a modulation and demodulation circuit (MDC) 2c, a superposition/separation circuit (S/SC) 2d, and a matching circuit (MC) 2e. The master body 2f is connected with a twisted pair wire 4 used as a transmission antenna. The control circuit 2a mainly includes a microcomputer. The high-frequency power generation circuit 2b generates a high-frequency signal (carrier signal) and outputs the generated signal as a power signal to the superposition/separation circuit 2d.

The modulation and demodulation circuit 2c can change a communication frequency and a modulation and demodulation method on the basis of the control by the control circuit 2a. The modulation and demodulation circuit 2c modulates communication data of the master 2 and outputs the communication data as a data modulation signal to the superposition/separation circuit 2d. The superposition/separation circuit 2d mixes a power carrier signal and the data modulation signal and outputs a mixed signal to the matching circuit 2e. The matching circuit 2e transmits the power carrier signal superimposed with the data modulation signal (the power signal and the data modulation signal: high-frequency signal) to the twisted pair wire 4.

The control circuit 2a is connected to the matching circuit 2e via a control line to control an impedance matching state of the matching circuit 2e (CHARA CONT). In addition, the control circuit 2a is connected to the modulation and demodulation circuit 2c via a control line to control the modulation and demodulation method (MDM CONT) and the data communication frequency (FRE CONT) of the modulation and demodulation circuit 2c.

As shown in FIG. 2A through FIG. 2D, the matching circuit 2e includes a transformer 2g and a variable capacitor 2h. The variable capacitor 2h is connected in series or parallel to primary and/or secondary side of the transformer 2g. Any circuit configuration may be applied to the matching circuit 2e if impedance matching is available.

Figure 3:
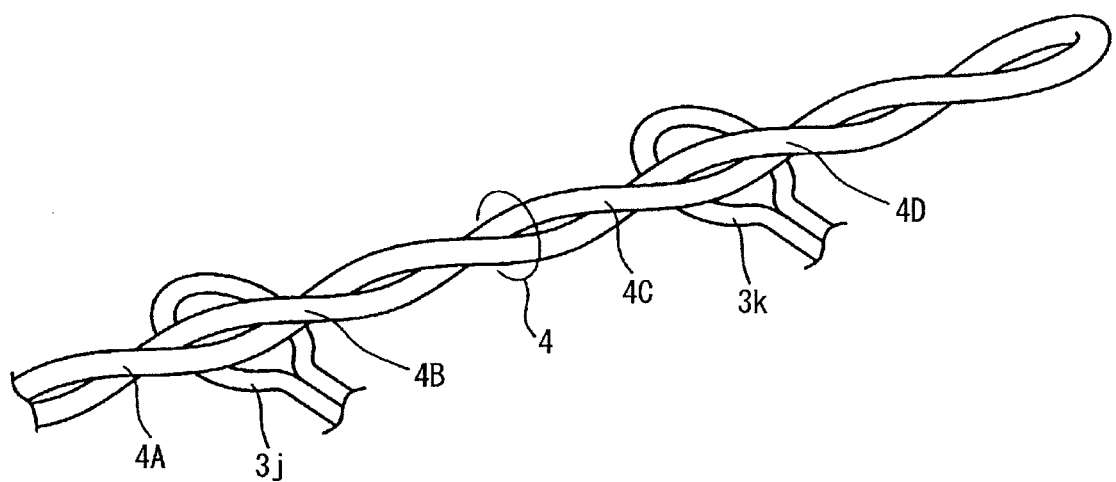
FIG. 3 is a perspective view of a twisted pair wire in which cores are connected at an end to form a loop shape.

FIG. 3 is a diagram showing a perspective view (especially, a configuration of the furthest end portion) of the twisted pair wire 4. The twisted pair wire 4 is installed in the vehicle and extends to a predetermined distance from an output terminal of the master body 2f to the farthest end portion.

As shown in FIG. 1 and FIG. 3, the twisted pair wire 4 has a loop shape in which core wires are connected at the furthest end portion.

As shown in FIG. 1, the twisted pair wire 4 extends to the vicinity of the slaves 3A through 3Z. For example, the twisted pair wire 4 may be an unshielded twisted pair (UTP) cable having no shield. While the master 2 transmits a signal, the twisted pair wire 4 hardly outputs a noise to the outside. This is because an applied current due to the high-frequency signal generates a magnetic flux between adjacent twists (corresponding to twisted portions) such as 4A and 4B and adjacent magnetic fluxes are reverse and balance each other. While the master 2 receives a signal, the twisted pair wire 4 is less likely to be influenced by radio waves arriving from the outside. This is because the twisted pair wire 4 causes a few flux linkage regions facing an external radio wave. Therefore, the twisted pair wire 4 can restrict generation of noise and can eliminate external noise.

As shown in FIG. 1, each of the slaves 3A through 3Z includes a control circuit (CC) 3a, a modulation and demodulation circuit (MDC) 3c, a feeding matching circuit (FMC) 3d, a communication matching circuit (CMC) 3e, a rectifier circuit (RC) 3f, a power monitoring circuit (PMC) 3g, an auxiliary rectifier circuit (ARC) 3h, and a selector (SEL) 3i. The control circuit 3a is an example of a determining portion, a setting portion, and a responding portion. The communication matching circuit 3e is an example of a matching portion. The power monitoring circuit 3g is an example of a power monitoring portion. The feeding matching circuit 3d is connected to an aperture antenna 3j for receiving power. The aperture antenna 3j is an example of a first aperture antenna. The communication matching circuit 3e is connected to an aperture antenna 3k for receiving data. The aperture antenna 3k is an example of a second aperture antenna.

In order to increase the feeding efficiency, the aperture antenna 3j may have a steep frequency characteristic with a high Q value.

The twisted pair wire 4 includes many twists 4A, 4B, and so on. An aperture region between the twists 4A and 4B faces the aperture region of the aperture antenna 3j of the slave 3A. An aperture region between the twists 4C and 4D faces the aperture region of the aperture antenna 3k of the slaves 3A.

In addition, as shown in FIG. 1, the aperture antennas 3j of the slaves 3B through 3Z respectively face the aperture region between the twists 4E and 4F through the aperture region between the twists 4I and 4J. Similarly, the aperture antennas 3k of the slaves 3B through 3Z respectively face the aperture region between the twists 4G and 4H through the aperture region between the twists 4K and 4L. In FIG. 1, in order to schematically show the positions of the twists 4A, 4B . . . , 4K, 4L of the twisted pair wire 4, the aperture regions of the twisted pair wire 4 (between the twists 4A and 4B, between the twists 4E and 4F, . . . , between the twists 4I and 4J) and the aperture regions of the aperture antennas 3*j* are illustrated so as to correspond to each other only in an X-direction.

Similarly, the aperture regions of the twisted pair wire 4 (between the twists 4C and 4D, between the twists 4G and 4H, . . . , between the twists 4K and 4L) and the aperture regions of the aperture antennas 3*k* are illustrated so as to correspond to each other only in the X-direction. However, actually, the aperture regions face to each other also in the Y-direction (see FIG. 3) so that the aperture regions overlap with each other.

Electromagnetic field is generated at the aperture regions between the twists (4A, 4B, . . . , 4G, 4H, . . . , 4K, 4L) of the twisted pair wire 4 and intensely enables electromagnetic induction coupling with the aperture antennas 3*j*, 3*k* for each of the slaves 3A through 3Z. The aperture antennas 3*j*, 3*k* for each of the slaves 3A through 3Z can contactlessly and intensely receive the power and the data modulation signals due to the electromagnetic field that is generated at the aperture regions between the twists 4A and 4B, between the twists 4C and 4D, . . . , between the twists 4K and 4L of the twisted pair wire 4.

As shown in FIG. 1 and FIG. 3, the aperture antennas 3*j*, 3*k* of the slaves 3A through 3Z have loop shapes, such as circular shapes, and receive the electromagnetic field generated at the twisted pair wire 4 by the electromagnetic induction coupling. Thus, the slaves 3A through 3Z can receive the power signal and the data modulation signal transmitted from the master body 2*f* of the master 2 via the aperture antennas 3*j*, 3*k*.

As shown in FIG. 2E and FIG. 2F, the feeding matching circuit 3*d* is a matching circuit in which a fixed capacitor 3I is connected in parallel or series with the aperture antenna 3*j* and matches to a feeding frequency band (e.g., 13.56 MHz band) of the power signal of high frequency. Instead of the fixed capacitor 3I, a variable capacitor may be used.

As shown in FIG. 2G and FIG. 2H, the communication matching circuit 3*e* is a matching circuit in which a variable capacitor 3*m* is connected in parallel or series with the aperture antenna 3*j*. The communication matching circuit 3*e* changes the capacitance of the variable capacitor 3*m* on the basis of control by the control circuit 3*a*. The communication matching circuit 3*e* performs an impedance matching to a predetermined frequency band (tens of MHz band) higher than the above-described feeding frequency band.

Figure 4:
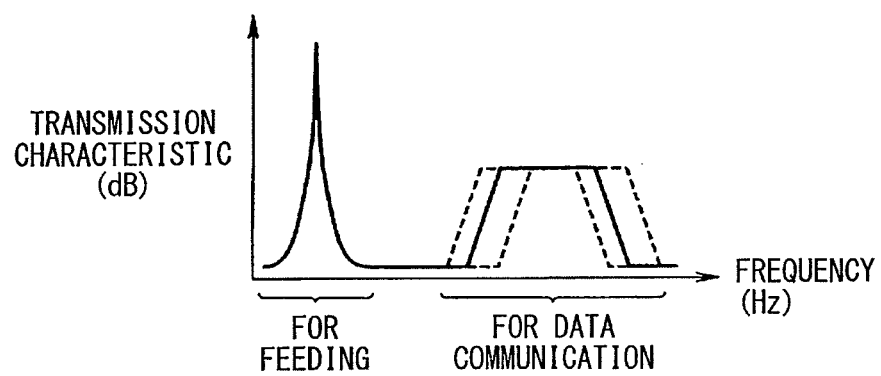
FIG. 4 is a diagram showing a frequency characteristic of a high frequency signal in which a feeding carrier and data communication carrier are superimposed.
Figure 5A:
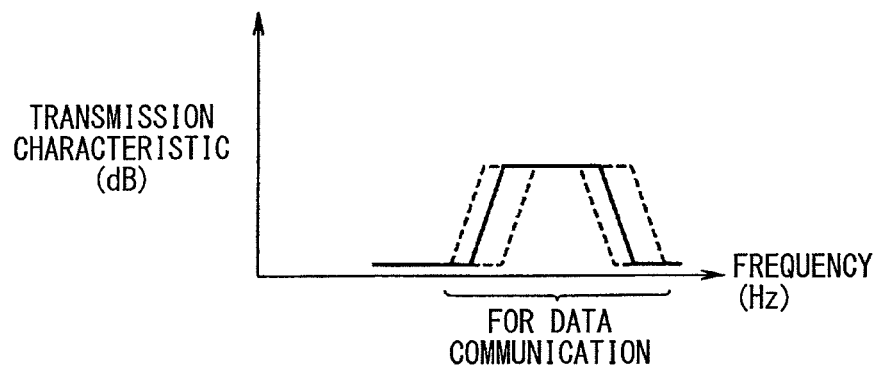
FIG. 5A is a diagram showing a frequency characteristic of a data communication signal received by the slave and FIG. 5B is a diagram showing a frequency characteristic of a feeding carrier received by the slave.
Figure 5B:
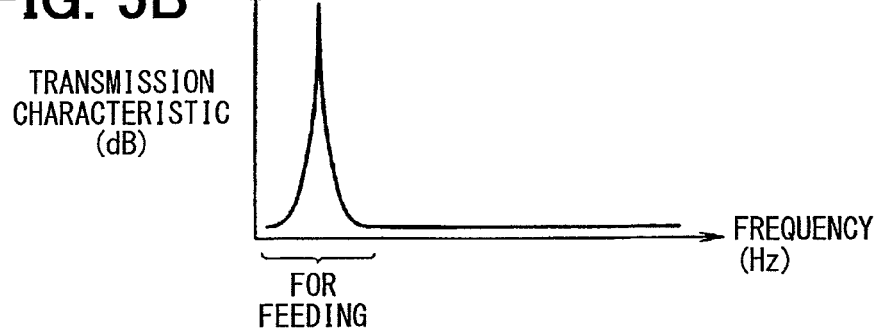

FIG. 4 is a diagram showing a transmission characteristic of the matching circuit 2*e* in the master 2. FIG. 5A and FIG. 5B are diagrams respectively showing transmission characteristics of the communication matching circuit 3*e* and the feeding matching circuit 3*d* in each of the slaves 3A through 3Z. As shown in FIG. 5A and FIG. 5B, because the feeding frequency band (e.g., 13.56 MHz band) and the communication frequency band (e.g., tens of MHz band) are separated, the matching circuit 2*e*, the feeding matching circuit 3*d*, and the communication matching circuit 3*e* can have more appropriate band widths and more appropriate transmission characteristics.

In the present embodiment, the communication frequency band is set to be higher than the feeding frequency band (13.56 MHz band) because the data communication speed is relatively high. However, when the data communication speed is low, the communication frequency band may be lower than the feeding frequency band.

Because the feeding matching circuit 3*d* is controlled to have the feeding frequency band, the feeding matching circuit 3*d* can receive the high frequency signal for power feeding (power alternating-current (AC) signal) with high efficiency. The feeding matching circuit 3 transmits the power AC signal to the rectifier circuit 3*f*.

The rectifier circuit 3*f* rectifies the power AC signal into direct-current (DC) power and supplies the DC power to the power monitoring circuit 3*g* and the selector 3*i*. In addition, the rectifier circuit 3*f* supplies the DC power to the control circuit 3*a* via the selector 3*i* and further supplies the DC power to the load 5A. The power monitoring circuit 3*g* detects a magnitude of the DC power supplied from the rectifier circuit 3*f* and transmits a monitored power data to the control circuit 3*a*.

The modulation and demodulation circuit 3*c* normally operates by power supplied from the rectifier circuit 3*f* via the selector 3*i*. The modulation and demodulation circuit 3*c* receives the data modulation signal via the aperture antenna 3*k* that is matched by the communication matching circuit 3 to the communication frequency band. The modulation and demodulation circuit 3*c* demodulates the data modulation signal with the communication frequency and the modulation and demodulation method controlled by the control circuit 3*a* and operates the load 5A on the basis of the demodulated data. The control circuit 3*a* controls the communication frequency and the modulation and demodulation method of the modulation and demodulation circuit 3*c*. Accordingly, the communication data can be transmitted from the master 2 to each of the slaves 3A through 3Z.

When data is transmitted from each of the slaves 3A through 3Z to the master 2, the control circuit 3*a* of each of the slaves 3A through 3Z instructs the modulation and demodulation circuit 3*c* to modulate data, transmits the modulation signal to the aperture antenna 3*k* via the communication matching circuit 3*e*. The aperture antenna 3*k* transmits the modulation signal as a radio wave signal. Accordingly, each of the slaves 3A through 3Z can appropriately transmit a response signal. When each of the slaves 3A through 3Z transmits the response signal from the aperture antenna 3*k*, the master 2 can contactlessly receive the responding signal via the aperture regions between the twists (i.e., between the twists 4C and 4D, between the twists 4G and 4H, . . . , between the twists 4K and 4L) of the twisted pair wire 4.

In the present embodiment, each of the slaves 3A through 3Z includes a feeding path in which power is supplied from the aperture antenna 3*k* via the auxiliary rectifier circuit 3*h* in addition to a feeding path in which is power is supplied from the aperture antenna 3*j* via the rectifier circuit 3*f*. The aperture antenna 3*k* is matched to the communication frequency band. However, for emergencies, each of the slaves 3A through 3Z has the feeding path that uses the signal in the communication frequency band as the power signal.

The feeding frequency band is narrower than the communication frequency band. Thus, each of the matching circuits 2*e*, 3*d*, the aperture antenna provided by the twisted pair wire 4, and the aperture antenna 3*j* need to correspond to a steep frequency characteristic. Even if the matching circuit 2*e* in the master 2 and the feeding matching circuit 3*d* in each of the slaves 3A through 3Z are set to the best characteristic, a frequency matching characteristic by the aperture antenna provided by the twisted pair wire 4, the aperture antenna 3*j*, the matching circuit 2*e*, and the feeding matching circuit 3*d* is easily influenced, for example, by a change in installed environment. For such a case, the feeding path in which the signal in the communication frequency band is used as the power signal is provided.

Figure 6:
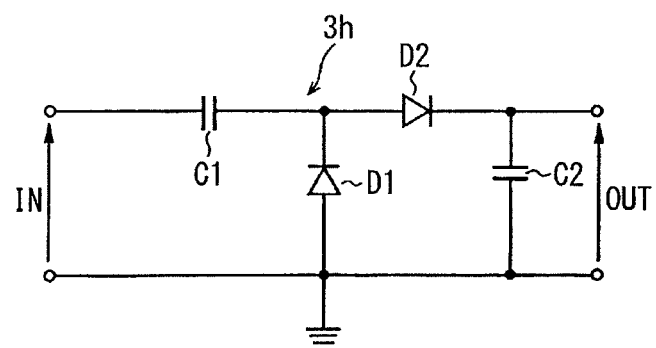
FIG. 6 is a diagram showing an example of an electrical configuration of an auxiliary rectifier circuit.
Figure 7:
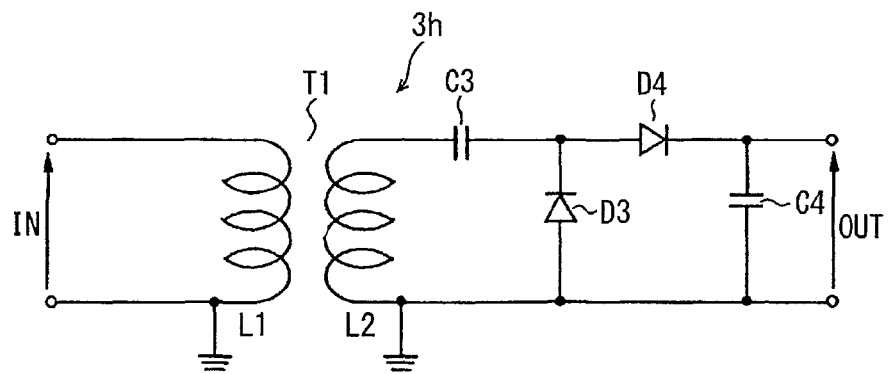
FIG. 7 is a diagram showing another example of an electrical configuration of the auxiliary rectifier circuit.
Figure 8:
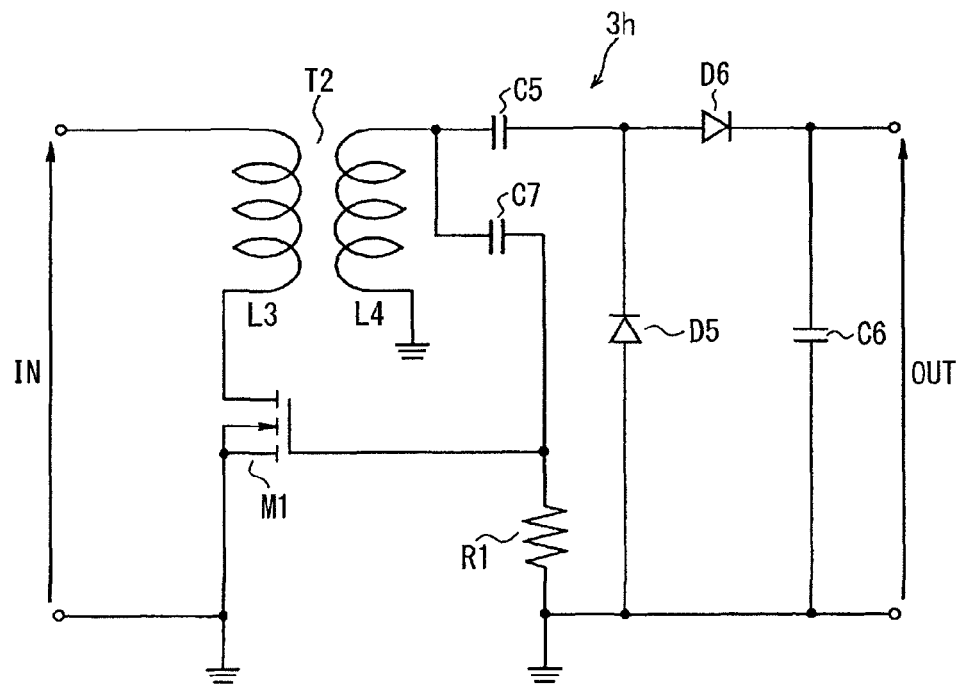
FIG. 8 is a diagram showing another example of an electrical configuration of the auxiliary rectifier circuit.

FIG. 6 through FIG. 8 are diagrams showing examples of the auxiliary rectifier circuit 3*h*. The auxiliary rectifier circuit 3*h* shown in FIG. 6 includes a capacitor C1 for cutting low frequency, rectifier diodes D1, D2, and a smoothing capacitor C2. The auxiliary rectifier circuit 3*h* converts a signal in the communication frequency band to DC voltage and outputs the DC voltage. The amplitude of the data communication signal tends to be lower than the amplitude of the feeding signal. Thus, a forward voltage Vf of the rectifier diodes D1, D2 in the auxiliary rectifier circuit 3h may be lower than a forward voltage Vf of a rectifier diode in the rectifier circuit 3f.

The auxiliary rectifier circuit 3h shown in FIG. 7 includes a transformer T1, a capacitor C3 for cutting low frequency, rectifier diodes D3, D4, and a smoothing capacitor C4. The auxiliary rectifier circuit 3h converts a signal in the communication frequency band to DC voltage and outputs the DC voltage. The number of turns of a secondary winding (a secondary inductance L2) of the transformer T1 is set to be larger than the number of turns of a primary winding, and the transformer T1 can transform an input signal IN with the communication frequency. After that, the rectifier diodes D3, D4, and the smoothing capacitor C4 convert into DC voltage. The auxiliary rectifier circuit 3h shown in FIG. 7 can have higher power conversion efficiency than the auxiliary rectifier circuit 3h shown in FIG. 6.

The auxiliary rectifier circuit 3h shown in FIG. 8 includes a transformer T2, a capacitor C5 for cutting low frequency, rectifier diodes D3, D4, and a smoothing capacitor C4. The auxiliary rectifier circuit 3h further includes a capacitor C7, a resistor R1, and an NMOS transistor M1. The capacitor C7 is connected in parallel with a secondary winding (secondary inductance L4) of the transformer T2 to form a self-excitation resonance circuit. The resistor R1 is connected in series with the self-excitation resonance circuit. A resonance voltage applied to the resistor R1 is input to a gate (control terminal) of the NMOS transistor M1 as a driving signal.

A source of the NMOS transistor M1 is connected to the ground, and a drain of the NMOS transistor M1 is connected in series with the primary winding (primary inductance L3). Accordingly, the NMOS transistor M1 feedbacks the resonance voltage to the primary winding. Because the secondary winding of the transformer T2 and the capacitor C7 resonate and positively feedback the NMOS transistor M1, the self-excitation resonance circuit can boost the output voltage with high efficiency. In addition, because the rectifier diodes D5, D6 and the capacitor C6 rectify and smooth, the auxiliary rectifier circuit 3h shown in FIG. 8 can generate boosted DC voltage more efficiently than the auxiliary rectifier circuits 3h shown in FIG. 6 and FIG. 7. Using the circuit configurations shown in FIG. 6 through FIG. 8, the signal in the communication frequency band can be used as the power signal. The configurations shown in FIG. 6 through FIG. 8 may also be used for the rectifier circuit 3f.

The control circuit 3a of each of the slaves 3A through 3Z switches a normal mode, a feeding shortage mode, or the like on the basis of the monitored power data detected by the power monitoring circuit 3g, and each of the slaves 3A through 3Z operates in the normal mode, the feeling shortage mode, or the like. A switching operation of the master 2 will be described with reference to FIG. 9, and a switching operation of the slaves 3A through 3Z will be described with reference to FIG. 10. Because the slaves 3A through 3Z operate similarly to each other, only the operation of the slave 3A will be described below, and description about the operations of the slaves 3B through 3Z will be omitted.

Figure 9:
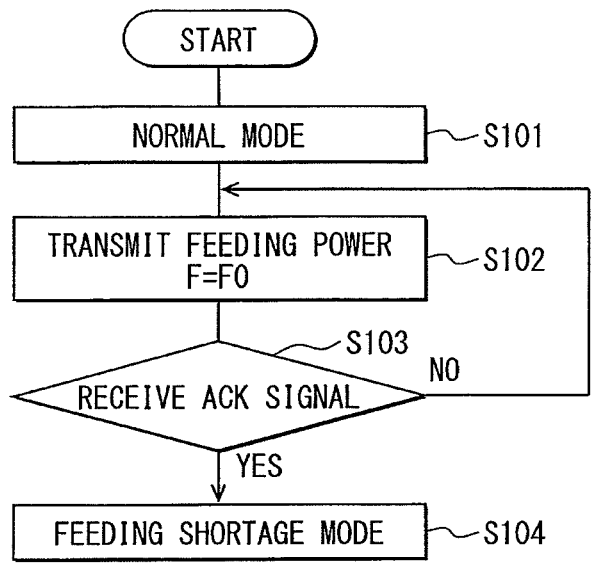
FIG. 9 is a flowchart showing a process performed by the master.
Figure 10:
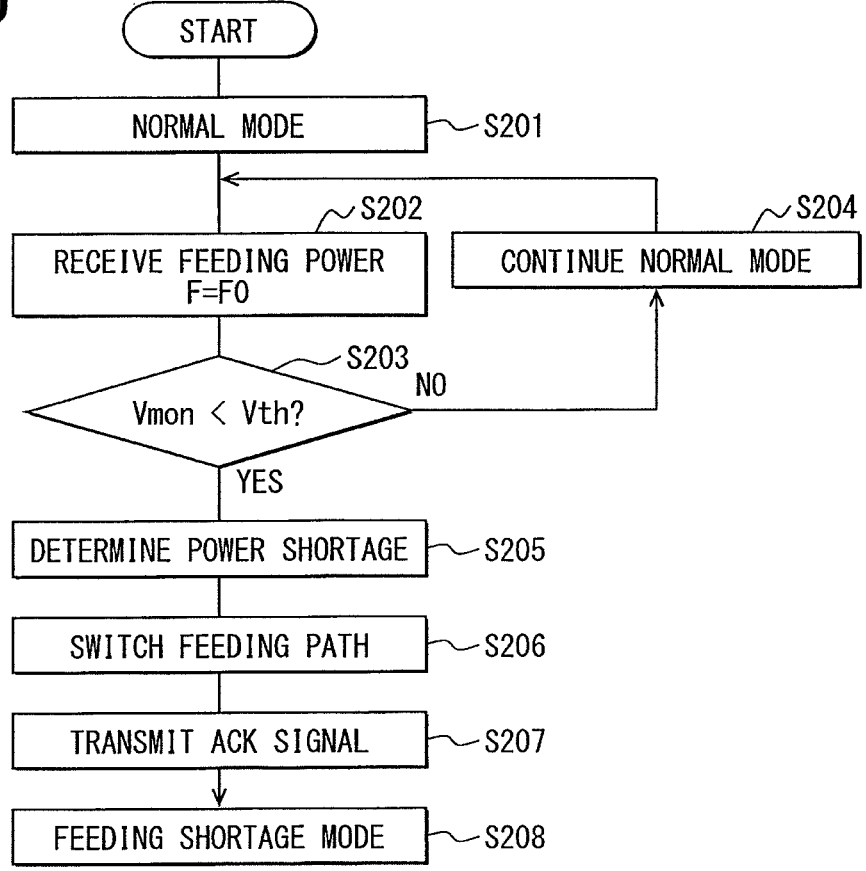
FIG. 10 is a flowchart showing a process performed by the slave.
Figure 11:
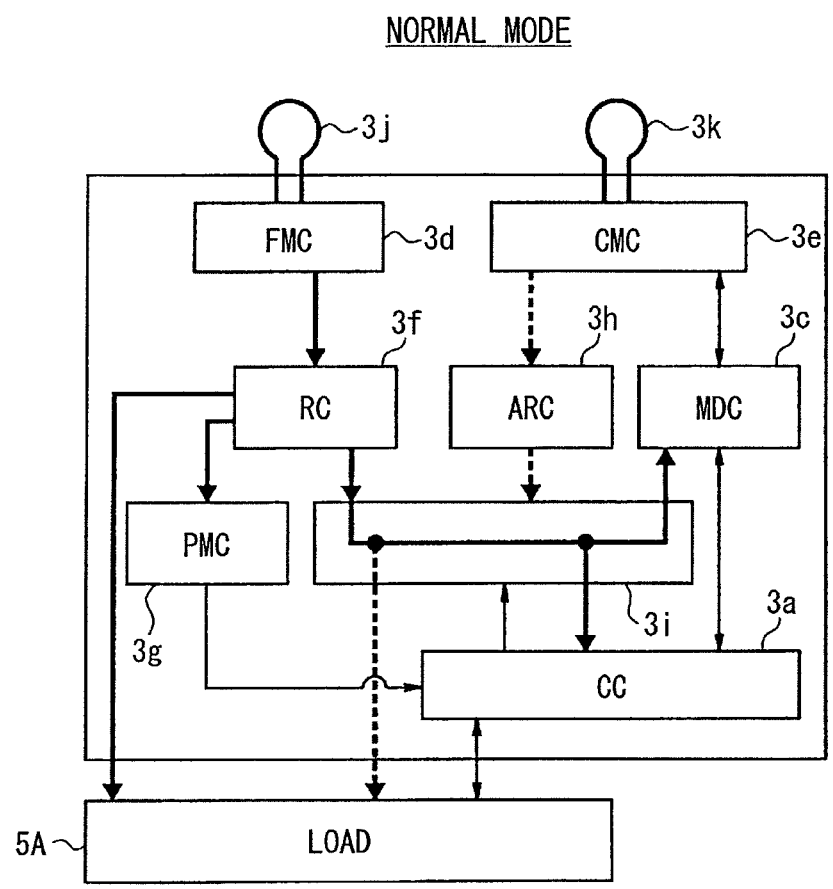
FIG. 11 is a diagram showing an example of a feeding path in the slave in a normal mode.

As shown in FIG. 9 and FIG. 10, both of the master 2 and the slave 3A start in the normal mode (S101, S201). When the control circuit 3a of the slave 3A is switched to the normal mode in the initial state, the selector 3i selects the aperture antenna 3j such that power is supplied from the aperture antenna 3j via the feeding matching circuit 3d and the rectifier circuit 3f. The flow of power in the slave 3A in the normal mode is shown by a bold solid line in FIG. 11. The selector 3i supplies the DC power obtained via the rectifier circuit 3f to the control circuit 3a and the modulation and demodulation circuit 3c.

When the master 2 transmits feeding power as a high frequency signal, the master 2 transmits the feeding power with an initial frequency F0 and the slave 3A receives the feeding power (S102, S202). The master 2 waits an acknowledge (ACK) signal transmitted from the slave 3A (S103).

Figure 12A:
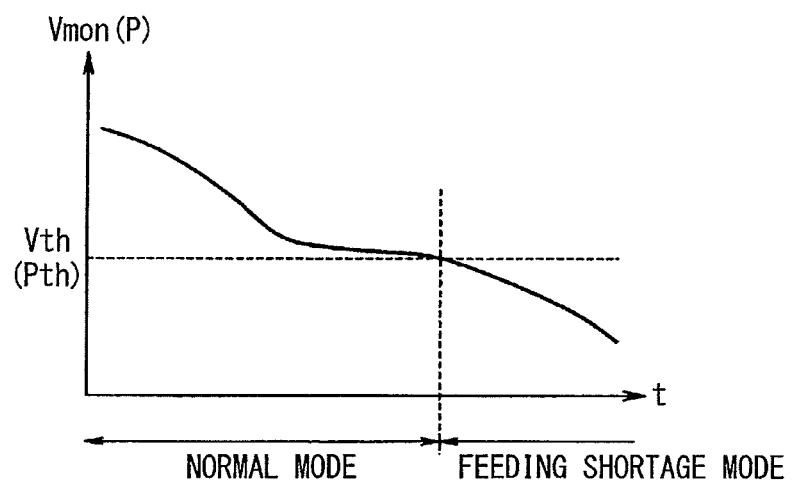
FIG. 12A is a diagram showing an example of a determination of shortage of power and FIG. 12B is a diagram showing another example of a determination of shortage of power.
Figure 12B:
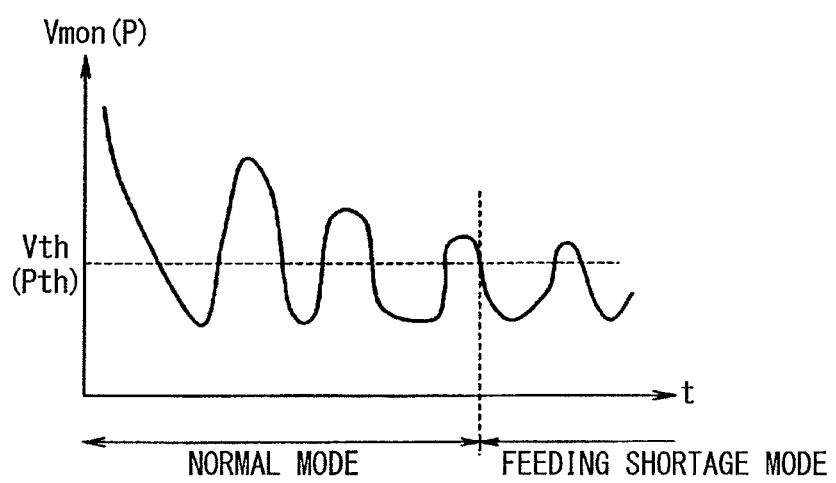

In the slave 3A, the power monitoring circuit 3g detects a detection voltage Vmon corresponding to the monitored power and determines whether the detection voltage Vmon is less than a predetermined threshold voltage Vth (S203). For example, the power monitoring circuit 3g may make a determination by simply detecting a time at which the detection voltage Vmon falls below the threshold voltage Vth as shown in FIG. 12A by a waveform of the detection voltage Vmon with respect to time t. Taking into account that alternating-current noise changing with time is easily superimposed, as shown in FIG. 12B, the power monitoring circuit 3g may determine that the detection voltage Vmon is less than the threshold voltage Vth when the detection voltage Vmon fluctuates and repeatedly falls below the threshold voltage Vth (corresponding to a threshold power) from a high-voltage side to a low-voltage side a predetermined number of times (e.g., four times) or more.

When the power monitoring circuit 3g determines that the detection voltage Vmon is not less than the threshold voltage Vth (S203: NO), the slave 3A continues the normal mode (S204) and returns to S202. When the power monitoring circuit 3g determines that the detection voltage Vmon is less than the threshold voltage Vth (S203: YES), the control circuit 3a determines shortage of power (S205) and instructs the selector 3i to switch the feeding path of the slave 3A from the feeding path shown by the solid line in FIG. 11 to the feeding path shown by the solid line in FIG. 13.

Figure 13:
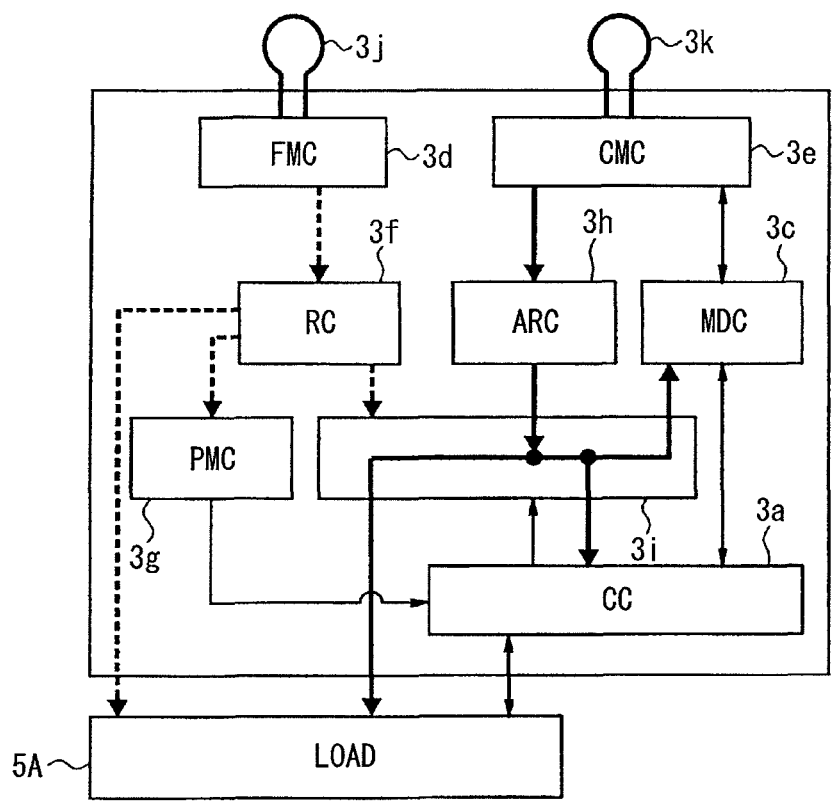
FIG. 13 is a diagram showing an example of a feeding path in the slave in a feeding shortage mode.

As shown in FIG. 13, the selector 3i switches to the feeding path in which power is supplied via the second aperture antenna 3k and the auxiliary rectifier circuit 3h. In other words, power supplied via the auxiliary rectifier circuit 3h is supplied to the control circuit 3a and the modulation and demodulation circuit 3c. In FIG. 13 which shows the feeding shortage mode, power is supplied to the modulation and demodulation circuit 3c, the control circuit 3a, and the load 5A only from the feeding path via the auxiliary rectifier circuit 3h. However, in a case where the feeding via the first aperture antenna 3j and the feeding matching circuit 3d is reduced but a feeding efficiency is not 0%, the modulation and demodulation circuit 3c, the control circuit 3a, and the load 5A may be supplied with power from the feeding path via the first aperture antenna 3j, the feeding matching circuit 3d, and the rectifier circuit 3f in addition to the feeding path via the auxiliary rectifier circuit 3h. In the present case, the feeding efficiency can be increased.

After that, the control circuit 3a in the slave 3A superimposes a feeding changing request on the ACK signal and transmits the superimposed ACK signal to the master 2. Then, the slave 3A transitions from the normal mode to the feeding shortage mode (S208).

When the master 2 receives the feeding changing request superimposed on the ACK signal (S103: YES), the master 2 transitions to the feeding shortage mode (S104). When the master 2 transitions to the feeding shortage mode, the control circuit 2a in the master 2 changes the feeding frequency from the initial frequency F0 to another feeding frequency and/or performs a matching adjustment control of the matching circuit 2e.

When the master 2 changes the feeding frequency from the initial frequency F0 to another feeding frequency, the control circuit 2a instructs the high-frequency power generation circuit 2b to change the feeding frequency. In the slave 3A, the power monitoring circuit 3g continues to monitor the feeding power. If the detection voltage Vmon does not become greater than equal to the threshold voltage Vth (S203: YES), the slave 3A transmits the ACK signal superimposed with the feeding changing request to the master 2 again so that the master 2 repeats the process of changing the feeding frequency.

Accordingly, the master 2 controls the feeding frequency of the high-frequency power generation circuit 2b such that power supplied from the master 2 to the slave 3A satisfies the above-described condition. The slave 3A may superimpose the detection voltage Vmon or a received power value corresponding to the detection voltage Vmon on the ACK signal transmitted to the master 2 so as to feedback control the master 2.

When the master 2 performs a matching process of the matching circuit 2e, the master 2 changes a capacitance of the variable capacitor 2h. Also in the present case, when the power monitoring circuit 3g in the slave 3A determines that the detection voltage Vmon does not become greater than or equal to the threshold voltage Vth, the master repeats the matching process of the matching circuit 2e. If the master 2 cannot perform a sufficient feeding process only by the matching process, the master 2 may change the feeding frequency of the high-frequency power generation circuit 2b. Accordingly, the master 2 can supply sufficient power to the slave 3A. The control circuit 2a is an example of a frequency control portion and a matching control portion.

In the present embodiment, the power monitoring circuit 3g detects the power signal transmitted via the first aperture antenna 3j, and the control circuit 3a determines whether to use the signal in the communication frequency band obtained via the second aperture antenna 3k. When the power monitoring circuit 3g determines that the detection voltage Vmon is less than the threshold voltage Vth, the signal obtained from the second aperture antenna 3k via the auxiliary rectifier circuit 3h is changed into the DC power and is used as the power signal. Alternatively, the DC voltage obtained by rectifying the feeding signal supplied via the first aperture antenna 3j and the DC voltage obtained by rectifying the communication signal supplied via the second aperture antenna 3k may be supplied together to the control circuit 3a, the modulation and demodulation circuit 3c, and the load 5A.

In the present embodiment, the control circuit 3a determines to use the signal with the communication frequency obtained from the second aperture antenna 3k as another operation power on condition that the detection voltage Vmon is less than the predetermined threshold value Vth. Thus, for example, even when the frequency matching of the matching circuit 2e and the feeding matching circuit 3d change due to change in the surrounding environment, such as change in transmission path characteristics, power is not sufficiently supplied from the aperture antenna provided by the twisted pair wire 4 and the aperture antenna 3j, and each of the slaves 3A through 3Z has a shortage of operation power, a power communication can be maintained, and a communication quantity and a high-speed communication can be maintained as much as possible using another operation power.

When the control circuit 3a determines that the monitor voltage Vmon is less than or equal to the threshold voltage Vth, the control circuit 2a transmits the feeding changing request, which indicates that the feeding power is low, to the control circuit 2a in the master 2. Then, the control circuit 2a in the master 2 changes the frequency of the power signal for feeding (carrier frequency for feeding) generated by the high-frequency power generation circuit 2b and/or changes the matching state of the matching circuit 2e. Thus, the supplied power between the master 2 and each of the slaves 3A can be improved.

Second Embodiment

Figure 14:
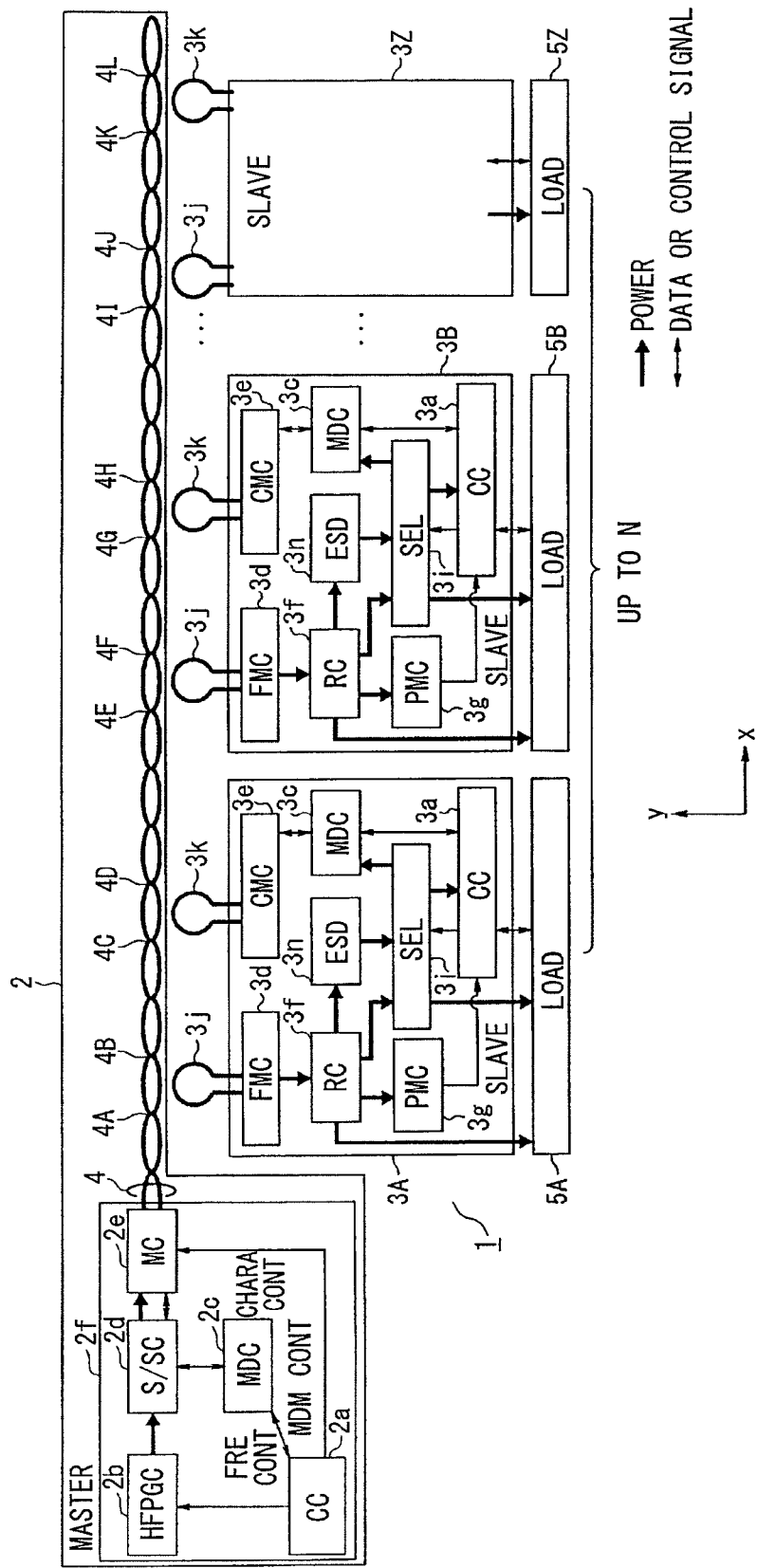
FIG. 14 is a diagram showing a power line communication system according to a second embodiment of the present disclosure.

A power line communication system 1 according to a second embodiment of the present disclosure will be described with reference to FIG. 14.

In the present embodiment, each of the slaves 3A through 3Z includes an electric storage device (ESD) 3n and does not include the auxiliary rectifier circuit 3h described in the first embodiment. The electric storage device 3n stores the DC power rectified and smoothed by the rectifier circuit 3f. The electric storage device 3n is always charged when the electric storage device 3n receives the power signal (i.e., the high-frequency signal) from the aperture antenna 3j.

An electric configuration of the electric storage device 3n may be changed on the basis of a type of each of the loads 5A through 5Z. For example, when each of the loads 5A through 5Z is a sensor, power consumption is relatively small and a requirement of downsizing is high. Thus, as the electric storage device 3n in each of the slaves 3A through 3Z, a capacitor for storing power (e.g., a capacitor having a capacitance of µF order) may be used.

When each of the loads 5A through 5Z is an actuator, power consumption tends to be higher than the power consumption of sensor. Thus, as the electric storage device 3n in each of the slaves 3A through 3Z, a rechargeable battery (e.g., a lithium ion battery) that can be charged with relatively high power may be used. The electric storage device 3n suitable for each of the loads 5A through 5Z can be selected by the above-described way.

A relationship between the master 2 and the slave 3A will be described below. In the normal mode, the selector 3i switches such that power is supplied from the rectifier circuit 3f to the control circuit 3a, the modulation and demodulation circuit 3c, and the load 5A. During the normal mode, the rectifier circuit 3f rectifies the high-frequency signal supplied from the aperture antenna 3j, and the electric storage device 3n is charged with the rectified high-frequency signal as power. When the detection voltage Vmon detected by the power monitoring circuit 3g is less than the threshold value Vth, the control circuit 3a switches to the feeding shortage mode, and the selector 3i switches such that the power is supplied from the electric storage device 3n to the control circuit 3a, the modulation and demodulation circuit 3c, and the load 5A. Thus, also in the present embodiment, the power line communication can be maintained, and a communication quantity and a high-speed communication can be maintained as much as possible using the electric storage device 3n as a supply source of another operation power.

Third Embodiment

Figure 15:
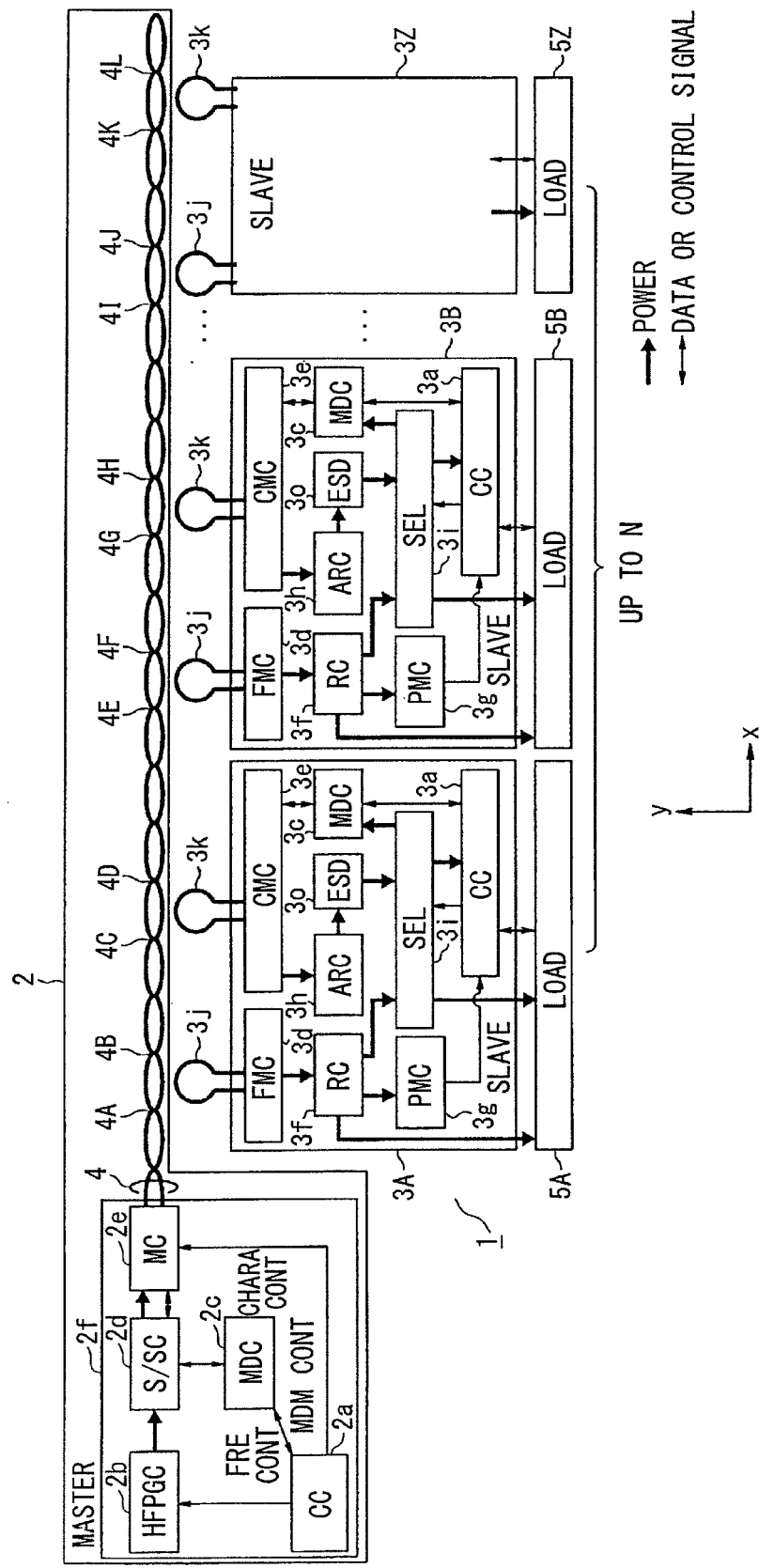
FIG. 15 is a diagram showing a power line communication system according to a third embodiment of the present disclosure.

A power line communication system 1 according to a third embodiment of the present disclosure will be described with reference to FIG. 15. In the present embodiment, each of the slaves 3A through 3Z includes the auxiliary rectifier circuit 3h and an electric storage device (ESD) 3o. The electric storage device 3o is charged with power signal supplied from the auxiliary rectifier circuit 3h. The auxiliary rectifier circuit 3h is connected to the communication matching circuit 3e. Thus, the electric storage device 3o receives the data communication frequency signal from the aperture antenna 3k via the communication matching circuit 3e and the auxiliary rectifier circuit 3h and stores the data communication frequency signal as the power signal.

A relationship between the master 2 and the slave 3A will be described below. In the normal mode, the selector 3i switches such that power is supplied from the rectifier circuit 3f to the control circuit 3a, the modulation and demodulation circuit 3c, and the load 5A. During the normal mode, the data communication frequency signal received at the aperture antenna 3k is supplied to the electric storage device 3o via the auxiliary rectifier circuit 3h, and the electric storage device 3o is charged with the data communication frequency signal as the power signal. When the detection voltage Vmon detected by the power monitoring circuit 3g is less than the threshold value Vth, the control circuit 3a switches to the feeding shortage mode, and the selector 3i switches such that power is supplied from the electric storage device 3o to the control circuit 3a, the modulation and demodulation circuit 3c, and the load 5A. Thus, also in the present embodiment, the power line communication can be maintained, and a communication quantity and a high-speed communication can be maintained as much as possible using the electric storage device 3o as a supply source of another operation power.

Fourth Embodiment

Figure 16:
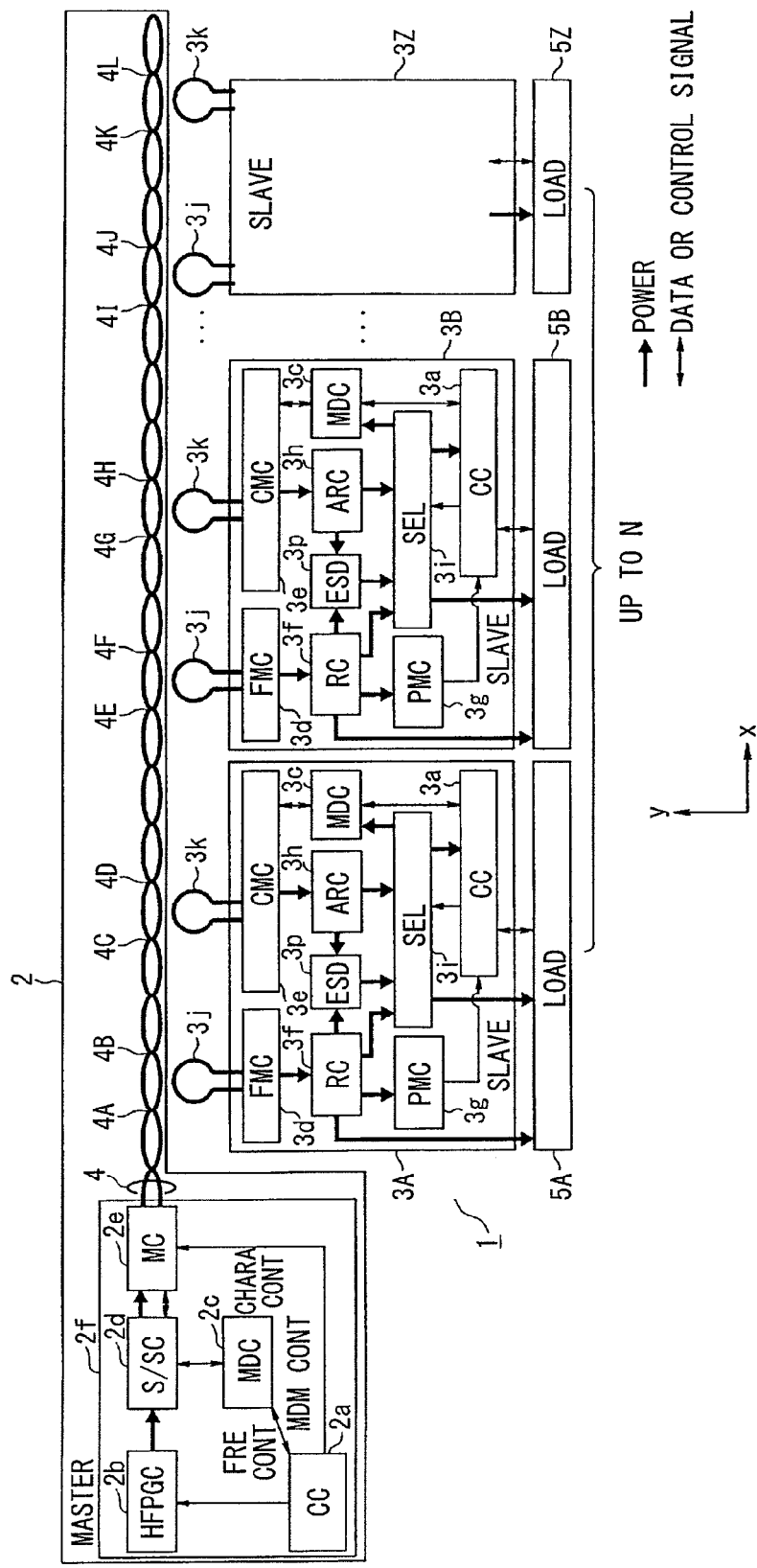
FIG. 16 is a diagram showing a power line communication system according to a fourth embodiment of the present disclosure.

A power line communication system 1 according to a fourth embodiment of the present disclosure will be described with reference to FIG. 16. In the present embodiment, each of the slaves 3A through 3Z includes the auxiliary rectifier circuit 3h, the rectifier circuit 3f, and an electric storage device (ESD) 3p. Both of the auxiliary rectifier circuit 3h and the rectifier circuit 3f charge the electric storage device 3p. The auxiliary rectifier circuit 3h is connected to the communication matching circuit 3e. The auxiliary rectifier circuit 3h rectifies the data communication frequency signal supplied from the aperture antenna 3k via the communication matching circuit 3e and supplies the rectified data communication frequency signal to the electric storage device 3p. The electric storage device 3p stores the rectified data communication frequency signal as the power signal. The rectifier circuit 3f is connected to the feeding matching circuit 3d. The rectifier circuit 3f rectifies the power signal for feeding supplied from the aperture antenna 3j via the feeding matching circuit 3d and supplies the rectified power signal to the electric storage device 3p. The electric storage device 3p stores the rectified power signal.

In the normal mode, the selector 3i switches such that power is supplied from the rectifier circuit 3f to the control circuit 3a, the modulation and demodulation circuit 3c, and the load 5A. During the normal mode, the data communication frequency signal rectified by the auxiliary rectifier circuit 3h is stored as the power signal in the electric storage device 3p, and the power signal rectified by the rectifier circuit 3f is preliminary stored in the electric storage device 3p.

When the detection voltage Vmon detected by the power monitoring circuit 3g is less than the threshold value Vth, the control circuit 3a switches to the feeding shortage mode, and the selector 3i switches such that power is supplied from the electric storage device 3p to the control circuit 3a, the modulation and demodulation circuit 3c, and the load 5A. Thus, also in the present embodiment, the power line communication can be maintained, and a communication quantity and a high-speed communication can be maintained as much as possible using the electric storage device 3p as a supply source of another operation power.

Other Embodiments

While only the selected exemplary embodiments have been chosen to illustrate the present disclosure, it will be apparent to those skilled in the art from the disclosure that various changes and modifications can be made therein without departing from the scope of the disclosure as defined in the appended claims.

In the fourth embodiment, each of the slaves 3A through 3Z selectively uses the power stored in the electric storage device 3p or the power obtained from the aperture antenna 3k via the auxiliary rectifier circuit 3h as another operation power. However, each of the slaves 3A through 3Z may use the power stored in the electric storage device 3p while using the power obtained from aperture antenna 3k via the auxiliary rectifier circuit 3h. Accordingly, the power line communication can be maintained using the power stored in the electric storage device 3p and the power obtained via the auxiliary rectifier circuit 3h.

In the above-described embodiments, when the power supplied from the master 2 to the slaves 3A through 3Z is low, the control circuit 2a changes the feeding frequency of the high-frequency signal (the carrier frequency for feeding) of the high-frequency power generation circuit 2b or changes the matching of the matching circuit 2e. In another embodiment, the control circuit 2a may instruct the high-frequency power generation circuit 2b to increase output power of the power signal. The control circuit 2a is an example of an output control portion.

The aperture regions between the twists 4A and 4B, between the twists 4C and 4D, . . . , and between the twists 4K and 4L facing the aperture antennas 3j and 3k in the slaves 3A through 3Z may be enlarged compared with other aperture regions in the multiple twists of the twisted pair wire 4. Accordingly, generation of noises can be effectively restricted and external noises can be effectively removed. In addition, the electromagnetic induction coupling between the twisted pair wire 4 and the aperture antennas 3j, 3k can be strengthened.

At facing regions of the aperture regions between the twists 4A and 4B, . . . , between the twists 4K and 4L of the twisted pair wire 4 and the aperture antennas 3j, 3k, cores such as ferrites may be inserted. In addition, the aperture regions facing the aperture antennas 3j, 3k may be enlarged compared with the aperture regions that do not face the aperture antennas 3j, 3k. Accordingly, the electromagnetic induction coupling between the aperture regions between the twists 4A and 4B, . . . , between the twists 4K and 4L and the aperture antennas 3j, 3k can be strengthened.

What is claimed is:

1. A power line communication (PLC) system for a vehicle comprising:
   a master using a twisted pair wire, in which core wires are connected at an end to form a loop shape, as a power line and a communication line and configured to output a high-frequency signal to the twisted pair wire to transmit a power signal and a data modulation signal; and
   a slave configured to receive the power signal and the data modulation signal transmitted from the master, the slave including a first aperture antenna, a second aperture antenna, a power monitoring portion, a determining portion, and a setting portion, the first aperture antenna having a loop shape and being configured to receive the power signal via the twisted pair wire by electromagnetic induction coupling of an electromagnetic field generated at the twisted pair wire in accordance with an applied current of the twisted pair wire, the first aperture antenna having an aperture region facing an aperture region between twists of the twisted pair wire, the second aperture antenna having a loop shape and being configured to receive the data modulation signal via the twisted pair wire by electromagnetic induction coupling of the electromagnetic field generated at the twisted pair wire in accordance with the applied current of the twisted pair wire, the slave being configured to operate by the power signal received via the first aperture antenna, the power monitoring portion being configured to monitor a power of the power signal received via the first aperture antenna, the determination portion being configured to determine whether to use an additional operation power received via the twisted pair wire on the basis of the power monitored by the power monitoring portion, and the setting portion being configured to set the slave to use the data modulation signal received from the second aperture antenna as the additional operation power when the determining portion determines to use the additional operation power, wherein the slave further includes a responding portion, the responding portion is configured to inform the master that the power supplied to the slave is low when the determining portion determines to use the additional operation power, the master further includes a matching control portion, the matching control portion is configured to perform a matching control with respect to the twisted pair wire when the master is informed by the responding portion that the power supplied to the slave is low.

2. The PLC system according to claim 1, wherein the determining portion is configured to determine to use the additional operation power on condition that the power monitored by the monitoring portion is less than a predetermined threshold power.

3. The PLC system according to claim 1, wherein the setting portion is configured to set the slave to use the data modulation signal received from the second aperture antenna as the additional operation power instead of the power signal received via the first aperture antenna when the determining portion determines to use the additional operation power.

4. The PLC system according to claim 1, wherein the setting portion is configured to set the slave to use the data modulation signal received from the second aperture antenna as the additional operation power in addition to the power signal received via the first aperture antenna when the determining portion determines to use the additional operation power.

5. The PLC system according to claim 1, wherein the determining portion is configured to determine to use the additional operation power on condition that the power monitored by the monitoring portion fluctuates and repeatedly falls below a predetermined threshold power a predetermined number of times.

6. The PLC system according to claim 1, wherein the slave further includes an electric storage device and a setting portion, the electric storage device is configured to store the power signal received from the first aperture antenna, and the setting portion is configure to set the slave to use the power signal stored at the electric storage device as the additional operation power when the determining portion determines to use the additional operation power.

7. The PLC system according to claim 1, wherein the slave further includes an electric storage device, the electric storage device is configured to store the data modulation signal received from the second aperture antenna as a power signal, and the setting portions is configured to set the slave to use the power signal stored at the electric storage device as the additional operation power when the determining portion determines to use the additional operation power.

8. The PLC system according to claim 1, wherein the slave further includes an electric storage device, the electric storage device is configured to store the power signal received from the first aperture antenna and the data modulation signal received from the second aperture antenna as power signals, and the setting portions is configured to set the slave to use the power signals stored at the electric storage device as the additional operation power when the determining portion determines to use the additional operation power.

9. The PLC system according to claim 1, wherein the slave further includes a responding portion, the responding portion is configured to inform the master that the power supplied to the slave is low when the determining portion determines to use the additional operation power, the master further includes a frequency control portion, and the frequency control portion is configured to change a carrier frequency of the power signal of the high-frequency signal when the master is informed by the responding portion that the power supplied to the slave is low.

10. The PLC system according to claim 1, wherein the slave further includes a responding portion, the responding portion is configured to inform the master that the power supplied to the slave is low when the determining portion determines to use the additional operation power, the master further includes an output control portion, and the output control portion is configured to increase an output power of the power signal of the high-frequency signal when the master is informed by the responding portion that the power supplied to the slave is low.

11. The PLC system according to claim 1, wherein the slave further includes a primary rectifying circuit connected to the first aperture antenna, configured to convert the power signal transmitted over the twisted pair wire into a first DC voltage, and an auxiliary rectifying circuit connected to the second aperture antenna, configured to convert the data modulation signal into a second DC voltage.

12. A receiving device for communicating with a master via a twisted pair wire as a power line and a communication line, the receiving device comprising:

a slave configured to receive a power signal and a data modulation signal from the master, the slave including a first aperture antenna, a second aperture antenna, a power monitoring portion, a determining portion, and a setting portion, the first aperture antenna having a loop shape and being configured to receive the power signal via the twisted pair wire by electromagnetic induction coupling of an electromagnetic field generated at the twisted pair wire in accordance with an applied current of the twisted pair wire, the first aperture antenna having an aperture region facing an aperture region between twists of the twisted pair wire, the second aperture antenna having a loop shape and being configured to receive the data modulation signal via the twisted pair wire by electromagnetic induction coupling of the electromagnetic field generated at the twisted pair wire in accordance with the applied current of the twisted pair wire, the slave being configured to operate by the power signal received via the first aperture antenna, the power monitoring portion being configured to monitor a power of the power signal received via the first aperture antenna, the determination portion being configured to determine whether to use an additional operation power received via the twisted pair wire on the basis of the power monitored by the power monitoring portion, and the setting portion being configured to set the slave to use the data modulation signal received from the second aperture antenna as the additional operation power when the determining portion determines to use the additional operating power, wherein
the slave further includes a responding portion,
the responding portion is configured to inform the master that the power supplied to the slave is low when the determining portion determines to use the additional operation power,
the master further includes a matching control portion,
the matching control portion is configured to perform a matching control with respect to the twisted pair wire when the master is informed by the responding portion that the power supplied to the slave is low.

13. The receiving device according to claim 12, wherein the slave further includes
    a primary rectifying circuit connected to the first aperture antenna, the primary rectifying circuit being configured to convert the power signal transmitted over the twisted pair wire into a first DC voltage, and
    an auxiliary rectifying circuit connected to the second aperture antenna, the auxiliary rectifying circuit being configured to convert the data modulation signal into a second DC voltage.

\* \* \* \* \*